United States Patent Office 3,563,924
Patented Feb. 16, 1971

3,563,924
SURFACTANT-CATALYST MIXTURES FOR FLEXI-
BLE POLYESTER URETHANE FOAMS
Eric G. Schwarz, Somers, N.Y., assignor to Union Car-
bide Corporation, a corporation of New York
No Drawing. Continuation-in-part of application Ser. No.
396,378, Sept. 14, 1964. This application Apr. 4, 1968,
Ser. No. 718,920
Int. Cl. C08g 22/44
U.S. Cl. 260—2.5
11 Claims

ABSTRACT OF THE DISCLOSURE

This invention relates to two types of surfactant catalyst mixtures for the use in producing flexible polyester urethane foams. The surfactants are siloxane-oxyalkylene copolymers which are characterized by certain molecular weights, siloxane contents and oxyethylene contents. The catalysts include both conventional amine catalysts and certain highly active catalysts (certain amine and tin catalysts) which have not been used previously to produce flexible polyester urethane foams. Compared to conventional organic emulsifiers, the novel surfactant-catalyst mixtures produce low density foam having finer, more uniform cell structure and high density foams with less shrinkage.

CROSS-REFERENCE TO RELATED APPLICATION

This application is a continuation-in-part of application Ser. No. 396,378, filed Sept. 4, 1964 now abandoned.

This invention relates to flexible polyester urethane foams and more particularly, to the use of certain organosilicon surfactants and catalysts in the production of such foams.

Flexible polyester urethane foams are conventionally produced by reacting a polyester containing hydroxyy groups, and polyisocyanates, in the presence of blowing agents (e.g., water), certain amine catalysts and organic surfactants. The surfactants are called "emulsifiers" and serve to stabilize the foam. Generally, two emulsifiers are required and these emulsifiers do not provide optimum stabilization unless they are premixed with the water and the amine catalyst with the result that the foam producer's flexibility in conducting the process is somewhat limited. Moreover, it is difficult to produce relatively low density foams (e.g. foams having densities of less than about 2.0 pounds per cubic feet) which possess fine uniform cell structure. On the other hand, it is difficult to produce high density foams (e.g. foams having densities of 5.0 to 6.0 pounds per cubic foot) without excessive shrinkage of the foam. These difficulties in producing low and high density foams appear to be attributable to the emulsifier-catalyst systems employed.

Further difficulties encountered in the production of flexible polyester urethane foams by conventional means derive from the fact that the amine catalysts employed are often relatively volatile and somewhat toxic and possess an unpleasant odor. Attempts to replace such amine catalysts in whole or in part with other catalysts, particularly more active amine catalysts or tin catalysts, have not been successful in view of the excessive shrinkage of the foam which results when such other catalysts are employed.

To the extent that the above difficulties in producing flexible polyester urethane foams are attributable to the organic surfactants (emulsifiers) employed, it might appear that at least some of the difficulties might be overcome by substituting siloxane-oxyalkylene copolymers for the organic surfactants. Such a substitution would seem to be feasible since such copolymers have been used as foam stabilizers with outstanding results in the production of other types of urethane foams. However, the substitution of various siloxane-oxyalkylene copolymers for organic surfactants in conventional reaction mixtures used to produce flexible polyester urethane foams has not been successful and satisfactory foams have not been produced thereby.

This invention is based, in part on the discovery that only certain combinations of siloxane-oxyalkylene copolymer surfactants (foam stabilizers) and catalysts are effective in producing satisfactory flexible polyester urethane foams. This invention provides two types of siloxane-oxyalkylene copolymer-catalyst mixtures for use in producing flexible polyester urethane foams. In addition to these surfactant-catalyst mixtures, this invention provides foam formulations comprising such mixtures and the other ingredients required to produce a flexible polyester urethane foam (i.e., a polyester, a polyisocyanate and a blowing agent). This invention further provides a process for producing flexible polyester urethane foams from such foam formulations and also provides the improved foams produced from such formulations. Both types of surfactant-catalyst mixtures of this invention are described below.

One type surfactant-catalyst mixture of this invention is composed of (1) a siloxane-oxyalkylene copolymer having a molecular weight from 780 to 17,000; a siloxane content from 14 to 42 weight percent based on the weight of the copolymer; and an oxyalkylene content of at least 75 weight percent based on the total amount of oxyalkylene groups in the copolymer and (2) a highly active catalyst for the production of urethanes. As used herein, a "highly active catalyst" for the production of urethanes denotes a compound whose catalytic activity for the reaction of hydroxyl groups and isocyanato groups to produce urethane groups is greater than the catalytic activity of N-ethyl morpholine. Techniques for determining the relative catalytic activity of catalysts for the hydroxyl-isocyanate reaction to produce urethanes are well known and one such method is described in detail hereinbelow. The conventional amine catalysts usually employed in producing flexible polyester urethane foams have relatively low catalytic activity and generally do not qualify as "highly active catalysts" as that term is employed herein. That is, the catalytic activity of conventional amine catalysts is no greater than the catalytic activity of N-ethyl morpholine. Mixtures of this type preferably contain conventional amine catalysts as additional components.

The second type surfactant-catalyst mixture of this invention is composed of (1) a siloxane-oxyalkylene copolymer having a molecular weight from 780 to 11,000; a siloxane content from 14 to 33 (preferably from 14 to 20) weight percent; and an oxyalkylene content of at least 75 weight percent based on the total amount of oxyalkylene groups in the copolymer and (2) a catalyst for the production of urethane foams. The catalysts that can be employed in these mixtures include both conventional amine catalysts used in producing flexible polyester urethane foams as well as the "highly active catalysts" employed in the first type of surfactant-catalyst mixture of this invention described above. This second type of mixture preferably contains both a conventional catalyst and a highly active catalyst.

Either of the above-described types of surfactantcatalyst mixtures of this invention can, of course, contain a siloxane-oxyalkylene copolymer having a minimum molecular weight of 3,000 as disclosed in above-mentioned application Ser. No. 396,378. However, a minimum copolymer molecular weight of 3,000 has now been found not to be critical.

Also, it has now been found that the maximum siloxane content of 20 weight percent disclosed in Ser. No. 396,378 for copolymers used with conventional amine catalysts can be raised to 33 weight percent if the catalyst is not too active (e.g., if it is less active than hexadecyl dimethyl amine for the reaction of COH and NCO to produce urethanes). A method for measuring such reactivities is disclosed below.

The effectiveness of the surfactant-catalyst mixtures of this invention is not particularly dependent on the surfactant (copolymer) concentration. In general, it is preferred that, the higher the siloxane content of the copolymer, the lower its molecular weight should be (within the above ranges).

As indicated above, the siloxane-oxyalkylene copolymers employed in the two types of surfactant-catalyst mixtures of this invention are characterized by certain molecular weights, siloxane contents and oxyethylene contents. Provided that the copolymers conform to these limitations, they may have any of a wide variety of structures and substituents and still be effective in this invention. With this qualification in mind, a more detailed description of some of the various classes of useful siloxane-oxyalkylene copolymers is presented below.

The siloxane-oxyalkylene copolymers that are useful in this invention have siloxane portions (or "blocks") composed of siloxane groups that are represented by the formula:

$$R_bSiO_{\frac{4-b}{2}} \quad (1)$$

wherein R is a monovalent hydrocarbon group or a divalent organic group and $b$ has a value from 1 to 3 inclusive. Each divalent organic group represented by R links a siloxane portion of the copolymer to an oxyalkylene portion of the copolymer. The groups represented by R can be the same or different in any given siloxane group or throughout the siloxane portion or block of the copolymer, and the value of $b$ in the various siloxane groups in the siloxane portion of the copolymer can be the same or different. Each siloxane portion of the copolymer contains at least one group represented by Formula 1 wherein at least one group represented by R is a divalent organic group.

Illustrative of the monovalent hydrocarbon groups that are represented by R in Formula 1 are the alkyl groups (for example, the methyl, ethyl, isopropyl, octyl, and dodecyl groups), the alkenyl groups (for example, the vinyl and the allyl group); the cycloalkenyl groups (for example, the cyclohexenyl group); the aryl groups (for example, the phenyl and naphthyl groups); the aralkyl groups (for example, the benzyl and the phenylethyl groups); the alkaryl groups (for example, the tolyl, and n-hexylphenyl groups), and the cycloalkyl groups (for example, the cyclohexyl group). If, desired such groups can contain substituents such as halogens and the like.

The structure of the divalent organic group represented by R in Formula 1 is dependent upon the type of reaction involved in producing the siloxane-oxyalkylene copolymer. Such copolymers can be produced by any number of reactions thereby giving rise to a variety of divalent organic groups linking the siloxane portion to the oxyalkylene portion of the copolymer. Typical of such reactions are the following:

(a) $\equiv SiOR^3 + HOC\equiv \longrightarrow \equiv SiOC\equiv + R^3OH$

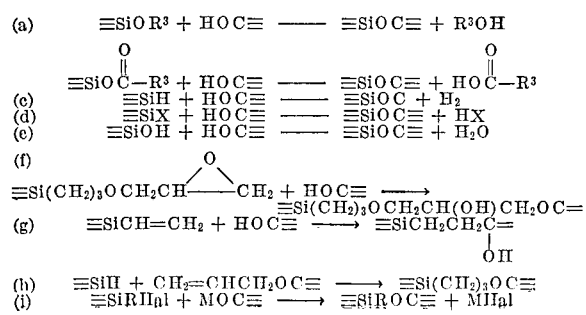

In the above Equations (a) to (i), $R^3$ represents a monovalent alkyl or aryl group, X represents a halogen atom or amino group, such as $NH_2$, $NHR^2$ and $NR_2^2$ wherein $R^2$ is a monovalent hydrocarbon radical, Hal represents a halogen, i.e., bromine, chlorine, fluorine, or iodine, M is an alkali metal such as sodium or potassium, and R is a divalent hydrocarbon radical, preferably a saturated aliphatic radical such as ethylene, propylene, n-butylene, isoamylene, hexamethylene and the like. In the Equations (a) through (i) the Si-containing group on the far left represents the reactive portion of the siloxane while the HOC$\equiv$ group represents a hydroxyl reactive portion of the organic polyol. In Equations (h) and (i) the Si-containing group on the far left represents the reactive portion of the siloxane and the $CH_2=CHCH_2OC\equiv$ and MOC$\equiv$ groups represents polyols in which some of the hydroxy groups have been replaced by allyloxy and metaloxy groups respectively in order to provide groups reactive with $\equiv SiH$ and $\equiv SiR$ Hal respectively.

Illustrative of the divalent hydrocarbon groups represented by R in Formula 1 are the alkylene groups (such as the methylene, ethylene, propylene, butylene, 2,2-dimethyl-1,3-propylene and decylene groups), the arylene groups (such as the phenylene and p,p'-diphenylene groups), and the alkarylene groups (such as the phenylethylene group). Preferably, the divalent hydrocarbon group is an alkylene group containing from two to four successive carbon atoms. Siloxane groups containing divalent hydrocarbon groups as substituents are illustrated by groups having the formulae:

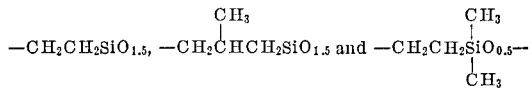

These divalent hydrocarbon groups are linked to a silicon atom of the siloxane chain or block of the copolymer by a silicon-to-carbon bond and to an oxygen atom of the oxyalkylene chain of the copolymer by a carbon-to-oxygen bond. Other divalent organic groups represented by R in Formula 1 are described herein below.

The copolymers useful in this invention can contain siloxane groups represented by Formula 1 wherein either the same hydrocarbon groups are attached to the silicone atoms (e.g., the dimethylsiloxy, diphenylsiloxy and diethylsiloxy groups) or different hydrocarbon groups are attached to the silicon atoms (e.g., the methylphenylsiloxy, phenylethylmethylsiloxy and ethylvinylsiloxy groups). These copolymers can contain one or more types of siloxane groups that are represented by Formula 1 provided that at least one group has at least one divalent hydrocarbon substituent. By way of illustration, only ethylenemethylsiloxy groups $$\left[-C_2H_4-\underset{\underset{CH_3}{|}}{Si}O-\right]$$

can be present in the siloxane block or the copolymer can contain more than one type of siloxane group, e.g., the copolymer can contain both ethylenemethylsiloxy groups and diphenylsiloxy groups, or the copolymer can contain ethylenemethylsiloxy groups, diphenylsiloxy groups and the diethylsiloxy groups. The copolymers useful in the compositions of this invention can contain trifunctional siloxane groups (e.g., monomethylsiloxane groups, $CH_3SiO_{1.5}$), difunctional siloxane groups (e.g., dimethylsiloxane groups, $(CH_3)_2SiO$—), monofunctional siloxane groups (e.g., trimethylsiloxane groups, $(CH_3SiO_{0.5})$ or combination of these types of siloxane groups having the same or different substituents. Due to the functionality of the siloxane groups, the copolymer can be predominantly linear or cyclic or cross-linked or it can have combinations of these structures.

The siloxane portion of the copolymers useful in the mixtures of this invention can contain organic end-blocking or chain terminating organic groups, in addition to the monofunctional siloxane chain terminating groups encompassed by Formula 1. By way of illustration, the siloxane portion can contain such organic end-blocking groups as the hydroxyl group, the aryloxy groups (such as the phenoxy group), the alkoxy groups (such as the methoxy, ethoxy, propoxy and butoxy groups), the acyloxy groups (such as the acetoxy group), and the like.

The siloxane portion of the copolymers useful in the mixtures of this invention can contain, in addition to the groups represented by Formula 1, siloxane groups represented by the formula

(1-a)

wherein R has the meaning defined in Formula 1, $e$ has a value from 0 to 2, $f$ has a value from 1 to 2 and $(e+f)$ has a value from 1 to 3, inclusive.

The oxyalkylene portions or "blocks" of the siloxane-oxyalkylene copolymers employed in the mixtures of this invention are composed of oxyalkylene groups represented by the formula:

$$[-R'O-] \quad (2)$$

wherein R' is an alkylene group provided that at least 75 weight percent of the oxyalkylene groups are oxyethylene groups. Preferably each oxyalkylene block contains at least four oxyalkylene groups. Illustrative of the oxyalkylene groups that are represented by Formula 2 are the oxyethylene, oxypropylene, oxy-1,4-butylene, oxy-1,5-amylene, oxy-2,2-dimethyl-1,3-propylene, oxy-1,10-decylene groups and the like. The oxyalkylene portion of the copolymers can contain more than one of the various types of oxyalkylene groups represented by Formula 2 provided that at least 75 weight percent of the oxyalkylene groups are oxyethylene groups. By way of illustration, the oxyalkylene blocks can contain only oxyethylene groups or both oxyethylene and oxypropylene groups, or other combinations of oxyethylene groups and the various other types of oxyalkylene groups represented by Formula 2.

The oxyalkylene portion of the copolymers employed in the mixtures of this invention can contain various organic end-blocking or chain terminating groups. By way of illustration, the oxyalkylene blocks can contain such end-blocking groups as the hydroxy group, the aryloxy group (such as the phenoxy group), the alkoxy groups (such as the methoxy, ethoxy, propoxy and butoxy groups), alkenyloxy groups (such as the vinyloxy and the allyloxy groups). Also, a single group can serve as an end-blocking group for more than one oxyalkylene chain. For example, the glyceroxy group,

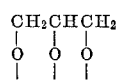

can serve as an end-blocking group for three oxyalkylene chains. Trihydrocarbylsiloxy groups (e.g. trimethylsiloxy groups) can also end-block the oxyalkylene chains.

The following classes of compounds are among the siloxane-oxyalkylene block copolymers useful in the mixtures of this invention.

(A) Copolymers that contain at least one unit that is represented by the formula:

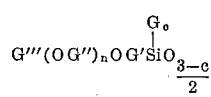
(3)

(B) Copolymers that contain at least one unit that is represented by the formula:

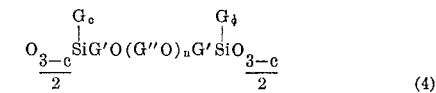
(4)

(C) Copolymers that contain at least one unit that is represented by the formula:

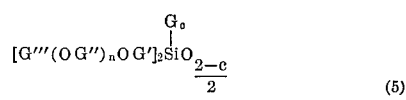
(5)

In the above Formulas 3, 4 and 5, G is a monovalent, hydrocarbon radical, G' is a divalent hydrocarbon radical, G'' is an alkylene radical containing at least two carbon atoms, G''' is a hydrogen atom or a monovalent hydrocarbon radical free of aliphatic unsaturation and $n$ has a value of at least four and $c$ has a value from 0 to 2 in Formulas 3 and 4 and a value from 0 to 1 in Formula 5. In Formulas 3, 4 and 5, G can represent the same or different radicals, $n$ preferably has a value from 4 to 30 inclusive and G'' can represent the same or different radicals, i.e., the group $(OG'')_n$ can represent, for example, the groups: $-(OC_2H_4)_p-$, $$-(OC_2H_4)_p(OC_3H_6)_q-$$

$-(OC_2H_4)_p(OC_8H_{16})_q-$, where $p$ and $q$ are integers.

The monovalent hydrocarbon radicals represented by G and G''' in Formulas 3, 4 and 5 can be any of the monovalent hydrocarbon groups included above in the definition of R for formula 1. The divalent hydrocarbon radicals represented by G' in Formulas 3, 4 and 5 can be any of the divalent hydrocarbon groups included above in the definition of R for Formula 1. Illustrative of the alkylene radicals containing at least two carbon atoms represented by G'' in Formulas 3, 4 and 5 are the ethylene, 1,2-propylene, 1,3-propylene, 1,6-hexylene, 2-ethylhexylene-1,6- and 1,12-dodecylene radicals.

A preferred class of siloxane-oxyalkylene copolymers that are useful in the mixtures of this invention are those which are composed of both groups represented by the Formulas 3, 4 or 5 and groups represented by the formula:

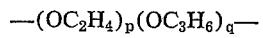

wherein R' is a monovalent hydrocarbon group as defined above for R in Formula 1 and $g$ has a value from 1 to 3 inclusive.

Siloxane-oxyalkylene copolymers that are especially suited for use in the mixtures of this invention are those having the formula:

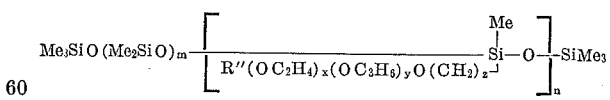

wherein $m$ has a value from 0 to 20 inclusive, $n$ has a value from 2 to 10 inclusive, $x$ has a value from 4 to 30 inclusive, $y$ has a value from 0 to 6 inclusive, $z$ has a value from 2 to 3 inclusive and R'' is an alkyl group containing from 1 to 4 carbon atoms inlusive "Me" is a methyl group ($CH_3$).

Another class of siloxane-oxyalkylene copolymers that are useful in the mixtures of this invention are those represented by the formula:

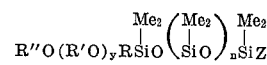

In this latter formula, R'' is a hydrogen atom or a hydrocarbyl, hydrocarbonoxy, acyl, trihydrocarbylsilyl or monovalent hydrocarbon carbamyl radical; R′ is an alkylene radical; y is a whole number; R is a divalent non-aromatic hydrocarbon radical, divalent non-aromatic hydroxy-substituted hydrocarbon radical, divalent non-aromatic acyl radical derived from a monocarboxylic acid or a divalent non-aromatic hydroxy ether radical; R is connected to the silicon via a siliconcarbon bond; n is equal to 0 or a positive whole number; and Z is a hydrocarbyl radical, a hydrocarbonoxy radical (i.e., $$R(OR')_yOR''$$

in which R, R′, y and R″ are as defined above) or of a radical of the formula —ASiB$_3$ in which A is a divalent hydrocarbon radical and B is a hydrocarbyl or a trihydrocarbylsiloxy radical.

A further class of siloxane-oxyalkylene copolymers that are useful in the mixtures of this invention are those containing in the group represented by the formula:

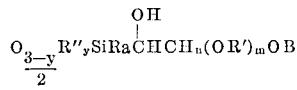

in which R″ is a hydrogen atom or a monovalent hydrocarbonoxy radical, monovalent hydrocarbon radical, monovalent halohydrocarbon radical or a monovalent halohydrocarbonoxy radical; y has a value from 0 to 3; R is a divalent radical attached to the silicon through a silicon-carbon bond (e.g., a divalent hydrocarbon radical, divalent halohydrocarbon radical or a divalent radical composed of carbon, hydrogen and oxygen in the form of ether linkages); of 1 or 2, n being 1 when the C of the CH$_n$ group is linked directly to R in a cycloaliphatic ring; R′ is an alkylene group, m is an integer of at least 1; and B is a hydrogen atom or a monovalent hydrocarbon radical, a monovalent hydrocarbonoxy radical or a monovalent halohydrocarbon radical.

Another class of siloxane-oxyalkylene copolymers useful in the mixtures of this invention are those wherein the siloxane moiety is linked to an oxyalkylene moiety by a divalent group composed of a divalent hydrocarbon group linked to a carbonyl group. Such copolymers are illustrated by those containing a unit having the formula:

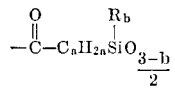

where R is a monovalent hydrocarbon radical or a halogenated monovalent hydrocarbon radical, a is an integer and b is an integer of from 0 to 2. The unsatisfied valence of the acyl carbon atom (—CO—) is attached through an oxygen linkage to a polyoxyalkylene chain.

Yet another class of siloxane-oxyalkylene copolymers that are useful in this invention are those wherein the siloxane moiety is linked to the oxyalkylene moiety by a group composed of a divalent hydrocarbon group attached to an oxygen atom (e.g. the —CH$_2$CH$_2$—O— group). In such groups the oxygen atom is attached to a silicon atom of the siloxane moiety. Since the carbon-to-oxygen-to-silicon bonds provided by such divalent organic groups are hydrolyzable, this variety of copolymer is commonly called "hydrolyzable copolymers." The siloxane block or moiety of such copolymers can consist solely of monohydrocarbonsiloxane units (RSiO$_{1.5}$) or it can consist solely of dihydrocarbonsiloxane units (R$_2$SiO) or it can consist of mixtures of such siloxane units and, if desired, trihydrocarbonsiloxane units (R$_3$SiO$_{0.5}$) as well. Accordingly, one class of these copolymers can be represented by the formula:

$$R'[(R_2SiO)_y]_a[C_nH_{2n}O)_x]_bR''$$

where y is an integer having a value of at least 2 and denotes the number of siloxane units, n is an integer denoting the number of carbon atoms in the oxyalkylene group, x is an integer and denotes the length of the oxyalkylene chain, and a and b are integers whose sum is 2 or 3. Another class of these copolymers can be represented by the formula:

$$[(R')(SiO_3)_x]_u(R_2SiO)_y[(C_nH_{2n}O)_zR'']_a[R''']_{3z-a}$$

where x is an integer and represents the number of trifunctional silicon atoms bonded to a single monovalent or multivalent hydrocarbon radical, R′; a is an integer and represents the number of polyoxyalkylene chains in the block copolymer; y is an integer, u has a value of at least 1, and denotes the number of difunctional siloxane units, n is an integer denoting the number of carbon atoms in the oxyalkylene group; and z is an integer and denotes the length of the oxyalkylene chain.

Other siloxane-oxyalkylene copolymer useful in the mixtures of this invention are those having a siloxane portion grafted to an oxyalkylene portion. Suitable graft copolymers include those produced by reacting a siloxane having an olefinically unsaturated group and an oxyalkylene polymer in the presence of a catalyst that is a free radical generator. The latter copolymers can be described as a graft copolymer of a polyoxyalkylene polymer which copolymer is a polyoxyalkylene molecule having the general formula $$R''[(OC_nH_{2n})_xOR']_a$$

wherein R′ is hydrogen, an acyl radical or a monovalent hydrocarbon radical, R″ is hydrogen or a monovalent hydrocarbon radical, a divalent hydrocarbon radical or a polyvalent hydrocarbon radical, a is an integer having a value equal to the valence of R″, n is in each occurrence an integer having a value of from 2 to 4 inclusive, x is in each occurrence an integer, said polyoxyalkylene molecule having attached thereto side chains of a polysiloxane, said side chains being attached to said polyoxyalkylene through a carbon-to-carbon bond in which one carbon atom of said bond is a carbon atom of an (OC$_n$H$_{2n}$) unit of said polyoxyalkylene molecule and in which the other carbon atom of said bond is linked to a silicon atom of the polysiloxane through at least one carbon atom.

Various of the above-described classes of siloxane-oxyalkylene copolymers are described in U.S. Pats. 2,834,-748, 2,846,458, 2,868,824, 2,917,480 and 3,057,901, in Belgian Pat. No. 603,552 and in U.S. patent application 61,356 filed Oct. 10, 1960, now U.S. Pat. No. 3,168,543.

The siloxane-oxyalkylene copolymers are preferably employed in this invention in amounts of from 0.15 to 4.0 parts by weight per 100 parts by weight of the total weight of the polyester and the polyisocyanate. The amount of copolymer used is the amount required to stabilize the foam.

As indicated above, catalysts that are useful in both types of the mixtures of this invention are those catalysts which have a high degree of activity in catalyzing the reaction of hydroxyl groups and isocyanate groups to produce urethanes. Typical catalysts of this variety are triethylamine, N,N,N′,N′-tetramethyl - 1,3-butane diamine, triethylene diamine, N,N-dimethyl ethanol amine, dibutyltin dilaurate, dibutyl tin di-2-ethylhexoate, stannous octoate and stannous oleate, and the like. Such catalysts preferably should be employed in amounts from 0.1 to 0.5 or 2 weight percent based on the total weight of the polyester and the polyisocyanate used.

In order to determine if a given catalyst possesses the requisite catalytic activity to qualify as a "highly active catalyst" as that expression is employed herein, the procedure described below can be employed.

A mixture of polyisocyanates (e.g. HYLENE TM) is reacted with a polypropylene glycol having a molecular weight of 1000 in a 2:1 molar ratio, in the presence of a catalyst. Obviously, another suitable polyisocyanate can be used in place of Hylene TM if desired. "Hylene TM" is a mixture of 80 weight percent 2,4-tolylene diisocyanate and 20 weight percent 2,6-tolylene diisocyanate. The reaction is conducted in an adiabatic system. The rate of formation of urethane linkages is determined by recording the temperature increase of the reaction mixture as a function of reaction time.

APPARATUS (1) Dewar flask, 80 millimeters internal diameter, 100 millimeters outer diameter, 150 millimeters inside depth and about 700 cubic centimeters in volume.

(2) A No. 14 rubber stopper (for the Dewar flask) in which is mounted:
 (a) Agitator shaft bearing.
 (b) Hylene TM addition funnel.
 (c) Glass tube with stopcock to serve as a conduit to a narrow glass bottle (see item 8 below).

The stopper also contains holes to admit a thermocouple (see item 3 below) and a viscosity probe (see item 4 below).

(3) Iron-constantan thermocouple connected to a recording potentiometer.

(4) Ultra-Viscoson recording viscosimeter and probe.

(5) Constant temperature bath, capable of maintaining a temperature of 30.0±0.1° C. (86.0±0.2° F.) in the Dewar flask.

(6) Constant temperature cabinet capable of maintaining a temperature of 30.0±0.5° C. (86.0±1° F.).

(7) Analytical burette, 10 cubic centimeters for measuring the catalyst solution.

(8) Narrow mouth glass bottle, 0.5 gallon, fitted with a rubber stopper in which is mounted an outlet tube communicating with the glass tube fitted in the stopper for the Dewar flask and a pressure bulb.

REAGENTS

The amount of polyisocyanates (Hylene TM) used is the amount required to react with 350 grams of glycol having hydroxyl number 112±3. If the hydroxyl number of the glycol falls outside this range, the amount of Hylene must be adjusted accordingly.

Component C (the catalyst) is employed in the form of a solution in urethane grade Cellosolve acetate.

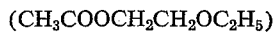

The concentration of the solution is adjusted so that 10 cubic centimeters contains the desired amount of catalyst. The solvent is first dried over anhydrous calcium sulfate.

Component A:
 Polypropylene glycol with a molecular weight of 1000:350 grams
Component B:
 Hylene TM: 117.5 grams
Component C:
 Catalyst: 10 cubic centimeters of solution

PROCEDURE (1) When not in use, Dewar flask should be kept in a constant-temperature cabinet at 30.0±0.5° C.

(2) Place containers of Components A, B and C in a constant temperature bath maintained at 30.0±0.1° C. (86.0±0.2° F.). The materials should be in the bath at least one hour prior to their use, to insure that they are at constant temperature.

(3) Weigh 350.0±0.5 grams of Component A into the Dewar flask. Weighing should be done in the constant temperature cabinet.

(4) Remove Dewar flask containing glycol from cabinet and add, from the burette, 10.0 cubic centimeter of Component C.

(5) Insert the stopper containing the agitator and other accessories into the mouth of the flask.

(6) Start the recording potentiometer. Allow 20 seconds warmup time before proceeding to Step 7.

(7) Add to the Dewar flask, over a five-second period, 117.5±0.5 grams of Component B. Start timing the reaction from this point.

(8) Record the Ultra-Viscoson reading every five seconds for the first two minutes, every 10 seconds for the next four minutes. The thermocouple and recording potentiometer provide a continuous record of the temperature of the mixture in the Dewar flask.

(9) After six minutes total reaction time, rapidly pump 200 cubic centimeters of toluene into the Dewar flask from the narrow mouth glass bottle. The toluene floods the reaction, slowing it down and preventing gelation of the polymer in the flask.

CALCULATION OF REACTION RATES

The reaction rates which are used in comparing catalyst systems are calculated from the potentiometer charts as follows:

Average Reaction Rate=$(T_{max}-T_0)/t$

Where:
$T_{max}$=maximum temperature attained in the Dewar flask during the reaction, ° F.
$T_0$=temperature of the reactants at the start of reaction, ° F. (i.e. 86.0±0.2° F.)
$t$=time to maximum temperature, seconds The activity of a catalyst is proportional to the Average Reaction Rate obtained with the catalyst. The more active the catalyst, the higher will be the Average Reaction Rate calculated.

REPRODUCIBILITY

Good reproducibility is obtained only when the temperature of the reactants at the start of the reaction is constant from test to test. For an "average" reaction rate of 1.8° F./second the reproducibility expected is ±0.1° F./second; for an "average" rate of 0.55° F./second, reproducibility expected is ±0.05° F./second.

Any catalyst which exhibits greater catalytic activity than N-ethyl morpholine in the above-described test procedure is a "highly active catalyst," as that phrase is used herein. Of course, any comparison made to determine relative catalyst activity must be made as equal catalyst concentrations. The above-described test procedure for evaluating the catalytic activity of catalysts is described in a "Foam Bulletin" published by the E. I. Du Pont de Nemours Company (Inc.) dated Mar. 16, 1960.

As pointed out above, one of the surfactant-catalyst mixtures of this invention contains either a highly active catalyst or any of the conventional catalysts employed in producing flexible polyester urethane foams. Such conventional catalysts include N-methyl morpholine, N-ethyl morpholine, hexadecyl dimethylamine, dimethyl benzyl amine, and N-cocomorpholine and the like. Such catalysts are preferably employed in the mixtures in an amount from 0.1 to 0.5 or 2 weight percent based on the total weight of the polyester and the polyisocyanate.

The above described surfactant-catalyst mixtures of this invention are employed in foam formulations of this invention to produce flexible polyester urethane foams. In addition to the mixtures, such foam formulations contain a polyester, a polyisocyanate and a blowing agent.

The polyesters employed in the foam formulations of this invention are the reaction products of polyfunctional organic carboxylic acids and polyhydric alcohols. The polyesters contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters can have hydroxyl numbers from 45 to 150 but preferably have hydroxyl numbers from 45 to 65. These hydroxyl numbers are readily determined according to the procedure described by Mitchel et al., Organic Analysis, vol. I, Interscience, New York 1953.

Typical of the polyfunctional organic carboxylic acids that can be employed in producing polyesters useful in the foam formulations of this invention are dicarboxylic aliphatic acids such as succinic, adipic, sebacic, azelaic, glutaric, pimelic and suberic acids and aromatic dicarboxylic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyesters.

Typical of the polyhydric alcohols that can be employed in producing the polyesters that are useful in the foam formulations of this invention are both the monomeric polyhydric alcohols (such as glycerol, 1,2,6-hexanetriol, ethylene glycol, trimethylol propane, trimethylolethane, pentaerythritol, propylene glycol, 1,3-butylene glycol and 1,4-butylene glycol) and the polymeric polyhydric alcohols such as those described below.

The polymeric polyhydric alcohols employed in producing the polyesters used in the foam formulations of this invention include the linear and branched chain polyethers which have a plurality of acyclic ether oxygens and contain at least two alcoholic hydroxyl radicals. Illustrative polyethers include the polyoxyalkylene polyols containing one or more chains of connected oxyalkylene radicals which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethylene oxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be reacted with ethylene oxide, propylene oxide, butylene oxide or mixtures thereof to provide polyethers that are useful in producing polyesters used in the foam formulations of this invention include glycerol, trimethylolpropane, 1,2,6-hexanetriol, pentaerythritol, sorbitol, glycosides, such as methyl, ethyl, propyl, butyl and 2-ethylhexyl arabinoside, xyloside, fructoside, glucoside and rhammoside, and polyethers prepared by the reaction of alkylene oxides with sucrose.

Further polyethers that are useful in producing polyesters that can be used in the foam formulations of this invention are prepared by reacting a 1,2-alkylene oxide such as ethylene oxide, propylene oxide, butylene oxide or mixtures thereof with mononuclear polyhydroxybenzenes such as resorcinol, pyrogallol, phloroglucinol, hydroquinone, 4,6 - di-t-butyl - catechol, catechol, orcinol, methylphloroglucinol, 2,5,6 trimethylresorcinol, 4-ethyl-5,6-dimethylresorcinol, n-hexylresorcinol and 4-chloro-5-methylresorcinol; polyethers prepared by reacting 1,2-alkylene oxides or mixtures thereof with fused ring systems such as 3-hydroxy-2-naphthol, 6,7-dihydroxy-1-naphthol, 2-hydroxy-1-naphthol, 2,5-dihydroxy-1-naphthol, 9,10-dihydroxyanthracene and 2,3-dihydroxyphenanthrene.

Other polyethers which can be employed in producing polyesters that can be used in the foam formulations of this invention are those obtained by reacting 1,2-alkylene oxides or mixtures thereof with polynuclear hydroxybenzenes such as the various di, tri- and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound. Exemplary diphenylol compounds include 2,2-bis(p-hydroxyphenyl)-propane; bis(p-hydroxyphenyl) methane and the various diphenols and diphenylol methanes disclosed in U.S. Pats. Nos. 2,506,486 and 2,744,882, respectively.

Tetraphenylol compounds which can be reacted with 1,2-alkylene oxides to produce polyethers that are useful in producing polyesters that can be used in the foam formulations of this invention include the alpha, alpha, omega, omegatetrakis(hydroxyphenyl)alkanes such as 1,1,2,2-tetrakis(hydroxyphenyl) - ethanes; 1,1,3,3-tetrakis (hydroxy - 3 - methylphenyl)propanes and 1,1,3,3-tetrakis(dihydroxy-3-methylphenyl)propanes and the like.

Other polyethers which can be employed in producing polyesters that can be used in the foam formulations of this invention are the ethylene oxide, propylene oxide and butylene oxide adducts of phenol-formaldehyde condensation product materials such as the novolaks. Novolaks are mixtures of polynuclear compounds of the diphenylmethane type of structure such as 4,4'-dihydroxy-diphenylmethane and 2,4'-dihydroxydiphenylmethane.

Polyethers suitable for use in producing polyesters that can be used in the foam formulations of this invention are prepared by reacting one or more of the alkylene oxides above noted with acyclic polyamines such as ethylenediamine propylenediamine, butylenediamine, pentylenediamine, hexylenediamine, octylenediamine, nonylenediamine, decylenediamine; polyalkylene polyamines such as diethylenetriamine, triethylenetetramine, tetraethylenepentamine and dipropylenetriamine.

Other suitable polyethers useful in producing polyesters that can be used in the foam formulations of this invention include the 1,2-alkylene oxide derivatives of mononuclear primary amines such as o-, m-, and p-phenylenediamine; polynuclear and fused aromatic polyamines such as 1,4-naphthylenediamine and 1,5-naphthylenediamine.

Higher functional mono- and polynuclear polyamines which also can be reacted with 1,2-alkylene oxides to provide polyethers suitable for use in producing polyesters that can be used in the foam formulations of this invention include 2,4,6-triaminotoluene and 2,3,5-triaminotoluene.

A variety of organic isocyanates can be employed in the foam formulations of this invention for reaction with the polyesters above described to provide flexible polyester urethane foams. Preferred isocyanates are polyisocyanates and polyisothiocyanates of the general formula:

wherein Y is oxygen or sulfur, $i$ is an integer of two or more and Q is an alkylene, substituted alkylene, arylene or substituted arylene radical, a hydrocarbon, or substituted hydrocarbon radical containing one or more aryl —NCY bonds and one or more alkyl —NCY bonds. Q can also include radicals such as —QZQ— where Z can be a divalent moiety such as —O—, —O—Q—O, —CO—, —CO₂—, —S—, —S—Q—S— and —SO₂—. Examples of such compounds include hexamethylene diisocyanate, 1,8-diisocyanato, p-methyl xylylene diisocyanate, (OCNCH₂CH₂CH₂OCH₂)₂, 1-methyl-2,4-diisocyanatocyclohexane, phenylene diisocyanates, tolylene diisocyanates, chlorophenylene diisocyanates, diphenylmethane-4,4' - diisocyanate, naphthalene - 1,5 - diisocyanate, triphenylmethane - 4,4',4" - triisocyanate, xylenealpha, alpha' - diisothiocyanate and isopropylbenzenealpha-4-diisocyanate.

Further included among the isocyanates useful in the foam formulations of this invention are dimers and trimers of isocyanates and diisocyanates and polymeric diisocyanates of the general formulas:

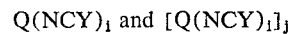

in which $i$ and $j$ are integers of two or more, as well as (additional components in the formulations) compounds of the general formula:

$$L(NCY)_i$$

in which $i$ is one or more and L is a monofunctional or polyfunctional atom or radical. Examples of this type include ethylphosphonic diisocyanate, $$C_2H_5P(O)(NCO)_2$$

phenylphosphonic diisocyanate, $C_6H_5P(O)(NCO)_2$; compounds containing a $\equiv$Si—NCY group, isocyanates derived from sulfonamides (QSO$_2$NCO), cyanic acid, thiocyanic acid, and compounds containing a metal —NCY radical such as tributyltin isocyanate.

The polyisocyanates are preferably employed in the foam formulations of this invention in amounts that provide from 90% to 105% of the stoichiometric amount of isocyanato groups required to react with all of the hydroxyl groups of the polyester and with any water present as a blowing agent.

The blowing agents employed in foam formulations of this invention include methylene chloride, water, liquefied gases which have boiling points below 80° F. and above —60° F., or by other inert gases such as nitrogen, carbon dioxide, methane, helium and argon. Suitable liquefied gases include saturated aliphatic fluorohydrocarbons which vaporize at or below the temperature of the foaming mass. Such gases are at least partially fluorinated and can also be otherwise halogenated. Fluorocarbon blowing agents suitable for use in forming the formulations of this invention include trichloromonofluoromethane, dichlorodifluoromethane, dichlorofluoromethane, 1,1-chloro - 1 - fluoroethane, 1 - chloro-1,1-difluoro, 2,2 - dichloroethane, and 1,1,1-trifluoro, 2-chloro-2-fluoro, 3,3-difluoro - 4,4,4 - trifluorobutane. The amount of blowing agent used will vary with density desired in the foamed product. Usually from 2 to 15 parts by weight of the blowing agent per 100 parts by weight of the polyester are preferred.

Other additional ingredients can be employed in producing flexible polyester urethane foams in accordance with the process of this invention if desired for specific purposes. Thus, inhibitors (e.g. d-tartaric acid and tertiary-butyl pyrocatechol) can be employed to reduce any tendency of the foam to hydrolytic or oxadative instability. Other additives that can be employed are dyes or pigments and anti-yellowing agents.

In accordance with the invention, flexible polyester urethane foams can be produced by any suitable technique. A preferred process is a one-step or one-shot technique wherein all of the reactants are reacted simultaneously with the foaming operation. The second type of general process is the prepolymer process. In this latter method a prepolymer is formed by reacting the polyester and a small excess of the isocyanate. The prepolymer is later foamed either by reaction with water or by an inert blowing agent. Thirdly, the quasi-prepolymer technique can be used to produce foams. In this technique, a larger excess of the isocyanate is first reacted with the polyester to give a product having a high percentage of free —NCO groups (e.g. from 20 to 30 percent) and this product is subsequently foamed by reaction with additional polyester in the presence of a foaming agent. In these various techniques, the foaming and urethane-forming reaction occur without the application of external heat. Thereafter, the foam can be heated (cured) at 110° F. to 140° F. for 10 to 20 minutes to eliminate any surface tackiness if desired.

The relative amounts of the various components reacted in accordance with the above-described processes for producing flexible polyester urethane foams in accordance with this invention are not narrowly critical. The polyester and the polyisocyanate are pressent in the foam formulations used to produce such foams in a major amount. The relative amounts of these two components is the amount required to produce the urethane structure of the foam and such relative amounts are well known in the art. The blowing agent, catalyst and surfactant are each present in a minor amount necessary to achieve the function of the component. Thus, the blowing agent is present in a minor amount sufficient to foam the reaction mixture, the catalyst is present in a catalytic amount (i.e. an amount sufficient to catalyze the reaction to produce the urethane at a reasonable rate) and the surfactant is present in a foam-stabilizing amount (i.e. in an amount sufficient to stabilize the foam). Preferred amounts of these various components are given hereinabove.

The flexible polyester urethane foams produced in accordance with this invention can be used in the same areas and for the same purpose as conventional flexible polyester urethane foams (e.g. they can be used as cushioning materials for seating or for packaging delicate objects, as gasketing material and as textile interliners.

This invention provides various improvements in the technology of producing flexible polyester urethane foams. With respect to the surfactant employed, this invention provides considerable convenience and flexibility since only a single non-catalytic surfactant (siloxane-oxyalkylene copolymer) is required and it need not be added to the reaction mixture in any particular sequence or combined with any other component or ingredient. (The surfactant-catalyst mixtures need not be preformed, i.e. the surfactant and the catalyst can be added separately to the foam formulations.)

The surfactant-highly active catalyst mixtures of this invention offer special advantages in the production of high-density, flexible polyester urethane foams. That is, high-density foams can be produced over a relatively wide catalyst concentration range without significant shrinkage or foam collapse. On the other hand, mixtures of conventional emulsifiers and highly active catalyst cause excessive shrinkage at normal catalyst concentrations and foam collapse at low catalyst concentrations. Accordingly, if highly active catalysts are used at all with conventional emulsifiers, it is necessary to control carefully the catalyst concentration to minimize both shrinkage and foam collapse.

The surfactant-highly active catalyst mixtures of this invention offer further special advantages in the production of low density polyester urethane foams. That is, low density foams can be produced having fine cell structure and readily controlled density. On the other hand, mixtures of conventional emulsifiers and highly active catalysts produce foams of coarse cell structure. Moreover, excessive gas loss occurs when the latter mixtures are employed with the result that the foam is of a higher density than desired.

Mixtures of this invention containing certain highly active catalysts (e.g. triethylene diamine and the various tin catalysts mentioned above) offer further advantages over conventional emulsifier-amine catalyst mixtures. In the latter mixtures, the amine catalysts often possess undesirable odor, volatility and toxicity which are not possessed by triethylene diamine and the tin catalyst employed in certain surfactant-catalyst mixtures of this invention.

Moreover, the foams produced in accordance with this invention have less "crown" and hence less waste foam than conventional foams.

Other advantages of the surfactant-catalyst mixtures of this invention over conventional surfactant-catalyst mixtures are set forth in the examples appearing below.

The following examples illustrate the present invention.

For the sake of brevity, the following designations are used to denote various compositions employed in the examples.

| Designation | Composition |
|---|---|
| Conventional organic surfactants (emulsifiers): | |
| E1 | This is N,N-diethyl oleamide. E1 is sold under the name Mobay A-3. |
| E2 | This is a sulfated or sulfonated ester produced by reacting propylene oxide and ethylene oxide with a fatty acid to produce an ester and then sulfating or sulfonating the ester. E2 is sold under the name of Witco 7786. |
| Siloxane-oxyalkylene copolymer*: | |
| Siloxane I (abbreviated Sil. I) | $Me_3SiO(Me_2SiO)_{5.1}[\underset{Me}{\underset{\|}{Si}}O]_{7.2}SiMe_3$ with side chain $Me(OC_2H_4)_{7.2}OC_3H_6$ |
| Siloxane II (abbreviated Sil. II) | $Me_3SiO(Me_2SiO)_{8.5}[\underset{Me}{\underset{\|}{Si}}O]_{3.5}SiMe_3$ with side chain $Me(OC_2H_4)_{16}OC_3H_6$ |
| Siloxane III (abbreviated Sil. III) | This is a mixture of 50 wt. percent Siloxane II and 50 wt. percent methoxy triglycol. |
| Siloxane IV (abbreviated Sil. IV) | $MeSi[(OSiMe_2)_4(OC_2H_4)_{16}OMe]_3$ |
| Siloxane V (abbreviated Sil. V) | $Me_3SiO(Me_2SiO)_{5.1}[\underset{Me}{\underset{\|}{Si}}O]_{9.3}SiMe_3$ with side chain $Me(OC_2H_4)_{7.2}OC_3H_6$ |
| Siloxane VI (abbreviated Sil. VI) | $Me_3SiO[Me\underset{\|}{Si}O]_8SiMe_3$ with side chain $Me(OC_2H_4)_{7.2}OC_3H_6$ |
| Siloxane VII (abbreviated Sil. VII) | $Me_3SiO(Me_2SiO)_{16}[\underset{Me}{\underset{\|}{Si}}O]_{5.8}SiMe_3$ with side chain $Me(OC_2H_4)_{7.2}OC_3H_6$ |
| Siloxane VIII (abbreviated Sil. VIII) | $Me_3SiO[\underset{Me}{\underset{\|}{Si}}O]_{37.0}SiMe_3$ with side chain $Me(OC_2H_4)_{7.2}OC_3H_6$ |

* Me, denotes the methyl group. The molecular weights and the siloxane contents of the above copolymers were as follows:

| Copolymer | Copolymer molecular weight | Weight percent siloxane |
|---|---|---|
| Siloxane: | | |
| I | 3,903 | 25.2 |
| II | 3,718 | 26.8 |
| III [1] | 3,718 | 26.8 |
| IV | 3,136 | 29.7 |
| V | 4,780 | 24 |
| VI | 3,768 | 14 |
| VII | 3,960 | 42 |
| VIII | 16,798 | 14 |
| IX | 780 | 33 |

[1] Copolymer component.

Catalysts for the production of urethanes:
| | |
|---|---|
| C1** | N-ethyl morpholine. |
| C2** | Hexadecyl dimethyl amine. C2 is sold under the name Armeen DM16D. |
| C3*** | N,N-dimethyl ethanol amine. |
| C4*** | Triethylene diamine. C4 is sold under the name DABCO. |
| SnOct | Stannous octoate. |

** Conventional catalyst
*** Highly active catalyst

Polyester Resin:
Polyester I _____ This is a commercially available polyester resin used in producing flexible polyester urethane foams. It is produced from adipic acid, diethylene glycol and trimethylol propane in a mole ratio of approximately 1:1:0.2. Polyester I has a hydroxyl number of about 50 to 56, a molecular weight of about 2,000, an acid number no greater than 2 and a viscosity of about 17,000 centistokes at about 25° C. Polyester I is sold under the name Witco Fomrex No. 50.

For the sake of brevity, the following abbreviations and terms are used to describe the quality of the foams produced in the examples:

"BS" is used as an abbreviation for "Buckshot." Buckshot is a term given to denote an imperfection in polyurethane foams, specifically a plurality of small approximately spherical voids in the foam.

"C.p.i." is used for "cells per inch." This denotes the number of cells per linear inch of the foam.

"Rise" denotes the foam height.

"Tight foam" denotes that some of the cells are closed but not an undesirably high percentage are closed.

EXAMPLE I

This example demonstrates the superiority of the surfactant-catalyst mixture of this invention over organic emulsifier-catalyst mixtures in producing low density flexible polyester urethane foam. Four series of runs (three runs in each series) were conducted employing various amounts of blowing agents (water alone or both water and FCCl₃). As shown in Table I a single siloxaneoxyalkylene copolymer surfactant can be used with a conventional catalyst and a tin catalyst whereas poor results are obtained with such catalysts and two organic emulsifiers. in Table I, foams 3, 6, 9 and 12 (as designated in the left-hand column) were produced in accordance with this invention while the data relating to the other foams is presented for purpose of comparison.

The foam formulations employed in producing the foams in this example were prepared in the following manner. Polyester I was weighed into a tared container (a 500 milliliter beaker in those cases where 100 grams of the polyester were used or a 1 liter beaker in those cases where 350 grams of the polyester were used). The siloxane-oxyalkylene copolymer and/or FCCl₃, if any, were mixed with the polyester. The organic emulsifiers (if any), amine catalysts, and water weer mixed in a 4-ounce jar. The contents of the jar were then mixed with the polyester using a spatula. Further mixing was done in a drill press equipped with two three-bladed marine-type propellers about two inches in diameter and having a 45° pitch.

In those cases where 100 grams of the polyester were used, the mixing in the drill press was accomplished at 1000 revolutions per minute for 8 seconds. Stannous octoate, if used, was added at this point. Then a mixture of diisocyanates was added (the mixture of diisocyanates was composed of 80 weight percent 2,4-tolylene diisocyanate and 20 weight percent 2,6-tolylene diisocyanate). The reaction mixture so produced was then mixed for 5 seconds and poured into a 165-ounce container (a No. 10 Lilly Tub).

In those cases where 350 grams of the polyester were used, the mixing in the drill press was accomplished at 2000 revolutions per minute for 15 seconds. Stannous octoate, if used, was added at this point. Then a mixture of diisocyanates was added (the mixture of diisocyanates was composed of 80 weight percent 2,4-tolylene diisocyanate and 20 weight percent 2,6-tolylene diisocyanate). The reaction mixture so produced was then mixed for 3 seconds and poured into a paper-lined 12″ x 12″ x 12″ box.

In all cases the amount of diisocyanates used was 105% of the stoichiometric amount required to react with the polyester and water present in the reaction mixture.

In all cases, the foam formulation (reaction mixture) foamed spontaneously. Thereafter, the foams were cured for 30 minutes at 130° C. Finally, the properties of the foam shown in Table I were observed. In all foam formulations used in producing the foams shown in Table I contained 1.9 parts by weight of C1 and 0.3 parts by weight of C2 per 100 parts by weight of the polyester. The amounts of the other components are shown in Table I.

EXAMPLE 2

Part A of this example shows that siloxane-oxyalkylene copolymers that do not possess the proper siloxane content are no better than conventional emulsifiers when used with those conventional amine catalysts as active as C2. Parts B, C and D of this example show that siloxane-oxyalkylene copolymer foam stabilizers (i.e., Siloxanes II and III) can be used with highly active amine catalyst (i.e., C3 and C4) whereas organic emulsifiers (i.e., E1 and E2) cannot be used as to great advantage with such catalysts. This result is shown in Table II for the production of both low and high density foams.

The numbers in the second thru the eighth vertical column of Table II are the parts by weight of the indicated component used per 100 parts by weight of Polyester I. The foams were prepared in the same manner as in Example 1.

TABLE II

| Foam | E1 | E2 | Siloxane II | Siloxane III | C1 | C2 | C3 | C4 | Rinse, in. | C.p.i. | Remarks |
|---|---|---|---|---|---|---|---|---|---|---|---|
| (A): 3.6 parts H₂O, nominal density 2.0 lb./ft.³ (100 grams of Polyester I used) | | | | | | | | | | | |
| 1 | 1.4 | 1.3 | | | 1.9 | 0.3 | | | 4.7 | 40–45 | Moderate BS, small center split. |
| 2 | | | 1.0 | | 1.9 | 0.3 | | | 5.0 | 35–40 | Moderate BS, top surface split. |
| (B): | | | | | | | | | | | |
| 3 | 1.4 | 1.3 | | | | | 0.63 | | 4.5 | 35–40 | Severe BS. |
| 4 | | | 1.0 | | | | 0.63 | | 4.9 | 40–45 | Very small surface split, tight foam. |
| (C): 1 part H₂O, nominal density 5.0 to 6.0 lb./ft.³ (300 grams of Polyester I used) | | | | | | | | | | | |
| 5 | 1.4 | 1.3 | | | | | 0.28 | | 4.5 | 45–50 | 6.1 lb./ft.³, severe BS, shrinkage, basal split. |
| 6 | | | 1.0 | | | | 0.28 | | 4.5 | 45–50 | 6.5 lb./ft.³, moderate BS, little shrinkage, no splits. |
| (D): | | | | | | | | | | | |
| 7 | 1.4 | 1.3 | | | | | | 0.1 | | | Foam collapsed completely. |
| 8 | | | 1.0 | | | | | 0.1 | 4.4 | 40–45 | Trace BS, very small surface split, 0.5″ top collapse. |

EXAMPLE 3

A foam formulation of this invention was prepared in the manner described in Example 1 containing 100 parts by weight of Polyester I, 1.9 parts by weight of N-ethyl morpholine, 0.1 part by weight of hexadecyl dimethyl amine, 0.2 part by weight of Siloxane IV, 0.05 part by weight of stannous octoate, 3.6 parts by weight of water and 45.2 parts by weight of a mixture of diisocyanates (the mixture of diisocyanates was composed of 80 weight percent 2,4-tolylene diisocyanate and 20 weight percent 2,6-tolylene diisocyanate). The foam formulation was foamed and cured as in Example 1 to produce a good

TABLE I

| Foam | H₂O, phr* | FCCl₃, phr* | E1, phr* | E2, phr* | Siloxane I phr* | SnOct,** phr* | Foam rise, in. | C.p.i. | Foam density, lb./ft.³ | Quality of foam |
|---|---|---|---|---|---|---|---|---|---|---|
| 100 grams of Polyester I used | | | | | | | | | | |
| 1 | 3.6 | | 1.4 | 1.3 | | | 4.7 | 40–45 | 1.93 | Moderate BS, small center split. |
| 2 | 3.6 | | 1.4 | 1.3 | | 0.3 | 4.75 | 20–25 | | Severe BS, closed cells. |
| 3 | 3.6 | | | | 1.0 | 0.3 | 5.3 | 45–50 | 1.88 | No splits, No BS. |
| 350 grams of Polyester I used *** | | | | | | | | | | |
| 4 | 3.6 | 10 | 1.4 | 1.3 | | | 6.7 | 30–35 | 1.63 | Severe BS, large voids. |
| 5 | 3.6 | 10 | 1.4 | 1.3 | | 0.4 | 7.3 | 25–30 | | Foam shrank. |
| 6 | 3.6 | 10 | | | 1.0 | 0.4 | 7.5 | 40–45 | 1.34 | Slightly tight foam, very small surface blister. |
| 350 grams of Polyester I used ** | | | | | | | | | | |
| 7 | 4.0 | | 1.4 | 1.3 | | | 6.2 | 25–30 | 1.77 | Severe BS, large voids at center. |
| 8 | 4.0 | | 1.4 | 1.3 | | 0.3 | 6.4 | 25–30 | 1.66 | Moderate BS, voids. |
| 9 | 4.0 | | | | 1.0 | 0.3 | 6.2 | 35–40 | 1.53 | Moderate BS, no voids. |
| 100 grams of Polyester I used | | | | | | | | | | |
| 10 | 5.0 | | 1.4 | 1.3 | | | 6.4 | 20–25 | 2.05 | Severe BS, splits. |
| 11 | 5.0 | | 1.4 | 1.3 | | 0.3 | 7.3 | 30–35 | 1.39 | Sea sponge surface, splits, void at bottom. |
| 12 | 5.0 | | | | 1.0 | 0.3 | 8.5 | 25–30 | 1.37 | Tight foam, no BS, no splits. |

*Phr denotes parts by weight per hundred parts by weight of Polyester I.
**1.9 parts by weight C1 and 0.3 parts by weight of C2 per 100 parts by weight of Polyester I also used in each run.
***Larger batches of reactants and so higher foam rise in these runs.
NOTE.—It is significant that in each of the four series of runs shown above the siloxane-oxyalkylene copolymer surfactant gave a lower density, finer cell structure and fewer voids than the organic surfactants.

flexible polyester urethane foam having a foam rise of 4.9 inches, having 15 to 20 cells per inch and having only moderate buckshot.

EXAMPLE 4

This example illustrates the importance of the molecular weight and siloxane content of the siloxane-oxyalkylene copolymers employed with a given catalyst in the practice of this invention. Eight foam formulations were prepared as described in Example 1. The formulations contained the following components. One hundred parts by weight of Polyester I, 3.6 parts by weight of water, 1.9 parts by weight of N-ethyl morpholine, 0.1 part by weight hexadecyl dimethylamine, 45.2 parts by weight of a mixture of diisocyanates (the mixture of diisocyanates was composed of 80 weight percent 2,4-tolylene diisocyanate and 20 weight percent 2,6-tolylene diisocyanate), 2.0 parts by weight of Siloxane V, VI, VII or VIII and stannous octoate in the amount shown in Table 3. The formulations were foamed and used as in Example 1.

TABLE IV

| Components of foam formulations | Foam 1 | Foam 2 | Foam 3 | Foam 4 |
|---|---|---|---|---|
| Polyester I | 100.0 | 100.0 | 100.0 | 100.0 |
| N-ethyl morpholine (C1) | 1.9 | 1.9 | 1.9 | 1.9 |
| Hexadecyl dimethylamine (C2) | 0.3 | 0.3 | 0.3 | 0.3 |
| Siloxane I | 1.0 | 1.0 | 1.0 | 1.0 |
| Distilled Water | 3.6 | 5.0 | 5.0 | 5.0 |
| Stannous octoate | 0.1 | 0.05 | | |
| Diisocyanates* | 45.2 | 59.9 | 59.9 | 59.9 |
| Triethylene diamine (C4) | | | 0.2 | |
| N,N-dimethylethanolamine (C3) | | | | 0.75 |

*The diisocyanates were a mixture of 80 weight percent 2,4-toluene diisocyanate and 20 weight percent 2,6-tolylene diisocyanate.

In all cases, an excellent flexible polyester urethane foam is obtained. Similar foam formulations were prepared containing two conventional emulsifiers in place of Siloxane I. In all cases, inferior foams were produced from the latter formulations.

TABLE III

| | Siloxane | | | | | | |
|---|---|---|---|---|---|---|---|
| No. | Molecular weight | Weight percent siloxane | Foam No. | SnOct* | Foam rise (Inches) | C.p.i. | Remarks |
| V | 4,780 | 24 | 1 | 0.10 | 4.5 | 40–45 | Trace BS, very small split. |
| | | | 2 | | 3.9 | 45–50 | Surface split, partial collapse. |
| VI | 3,768 | 14 | 3 | 0.10 | 5.2 | 35–40 | Moderate BS. |
| | | | 4 | | 5.0 | 40–45 | Trace BS, no splits, no shrinkage. |
| VII | 3,960 | 42 | 5 | 0.1 | 5.4 | | Moderate BS, tight. |
| | | | 6 | Foam boiled (No foam rise) | | | |
| VIII | 16,798 | 14 | 7 | 0.1 | 4.8 | 20–25 | Moderate BS, tight foam. |
| | | | 8 | | 4.8 | 10–15 | Severe BS. |

*Parts by weight per 100 parts by weight of Polyester I.

The unsatisfactory performance of foam 2 is due to the use of a surfactant having a siloxane content that is too high for use with a conventional amine catalyst as active as C2. The unsatisfactory performance of foam 6 is due to the use of a surfactant having a siloxane content that is too high for use with only conventional amine catalysts. The unsatisfactory performance of foam 8 is due to the use of a surfactant whose molecular weight is too high for effective use with only conventional amine catalysts.

When surfactants similar in structure to Siloxanes V, VI, VII and VIII but differing in that the oxyalkylene portion contained 50 weight percent oxyethylene groups and 50 weight percent in oxypropylene groups were employed as above in producing flexible polyurethane foams, unsatisfactory foams were obtained. These unsatisfactory results were due to the presence of insufficient oxyethylene groups in the oxyalkylene portion of the surfactants.

EXAMPLE 5

In this example four foam formulations are prepared and converted to flexible polyester urethane foams in accordance with the general procedure described in Example 1. The amounts of the components used in producing the foam formulation are shown in Table IV. The numbers represent parts by weight of the indicated components in the foam formulations.

EXAMPLE 6

In this example seven foam formulations were prepared and converted to flexible polyester urethane foams in accordance with the general procedure described in Example 1. The amounts of the components used in producing the foam formulations are shown in Table V. The numbers in Table V represent parts by weight of the indicated components in the foam formulation.

TABLE V

| Components of foam formulations | Foam 1 | Foam 2* | Foam 3 | Foam 4 | Foam 5 | Foam 6 | Foam 7 |
|---|---|---|---|---|---|---|---|
| Polyester II** | 100.0 | 100.0 | 100.0 | 100.0 | 100.0 | 100.0 | 100.0 |
| Dimethylbenzyl amine | 1.4 | 1.4 | 1.4 | | 1.4 | 1.4 | 1.4 |
| Siloxane I | 1.0 | 1.0 | 1.0 | 1.0 | 1.0 | 1.0 | 1.0 |
| Distilled water | 4.35 | 4.35 | 4.35 | 7.35 | 7.35 | 7.35 | 7.35 |
| Stannous octoate | 0.3 | 0.3 | | | 0.3 | | |
| Diisocyanates*** | 51.3 | 51.3 | 51.3 | 77.9 | 77.9 | 77.9 | 77.9 |
| Triethylamine | | | 0.5 | | | | |
| Triethylene diamine (C4) | | | | | 1.2 | | |
| Tetramethyl butane diamine | | | | | | 0.3 | 0.2 |

*0.1 part of tertiary butyl pyrocatechol also present as a stabilizer.
**This is a commercial available polyester resin produced by reacting glycerol, adipic acid and diethylene glycol. It is sold under the name "Desmophen 2200", and has a hydroxyl number of about 60±3.
***A mixture of diisocyanates was employed composed of 65 weight percent 2,4-tolylene diisocyanate and 35 weight percent 2,6-tolylene diisocyanate.

In forming the foam formulations used to produce foams 1, 2 and 3 in Table V a mixer speed of 1000 revolutions per minute was used in the drill press while in forming the foam formulations used in producing foams 4, 5, 6 and 7 a mixer speed of 3000 revolutions per minute was used. In each case, an excellent flexible polyester urethane foam was obtained. Due to the presence of the active catalyst, the foams lost their tackiness in a relatively short period of time. Moreover, Siloxane I is noncatalytic (hence this variable can be controlled solely by choice of catalyst) and is stable in the other components in the foam formulations. Siloxane I is conveniently added separately to such formulations dissolved in a suitable solvent (e.g. dioctyl phthalate) or pre-mixed with the catalyst and blowing agent or (as in Example 1) pre-mixed with the polyester resin.

Mixtures containing a major amount of a polyester resin and a minor amount of a siloxane-oxyalkylene copolymer along with, if desired, a minor amount of a catalyst and/or blowing agent can be readily prepared. Such mixtures can be stored and, when desired, combined with the remaining foam formulation components required to produce a foam.

EXAMPLE 7

This example illustrates that siloxane-oxyalkylene copolymers having molecular weights as low as 780 can be employed in either type of the surfactant-catalyst mixtures of this invention. In this example the copolymer (Siloxane IX) used had a molecular weight of 780 and a siloxane content of 33 weight percent and can be represented by the formula:

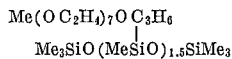

where "Me" denotes the methyl group.

(A) A polyurethane foam was produced in the same manner as in Example I from 100 grams of Polyester I, 1.0 gram of Siloxane IX, 2.0 grams of N-ethyl morpholine, 3.6 grams of water and 45.2 grams of a mixture of diisocyanates composed of 80 weight percent 2,4-tolylene diisocyanate and 20 weight percent 2,6-tolylene diisocyanate. The foam had a rise of 4.4 inches, 55 to 60 cells per inch, moderate buckshot and a density of 2.2 pounds per cubic foot.

(B) A polyurethane foam was produced in the same manner as in Example I from 100 grams of Polyester I, 1.0 gram of Siloxane IX, 1.9 grams of N-ethyl morpholine, 0.3 gram of hexadecyl dimethyl amine, 3.6 grams of water, 0.3 gram stannous octoate and 45.2 grams of a mixture of diisocyanates composed of 80 weight percent 2,4-tolylene diisocyanate and 20 weight-percent 2,6-tolylene diisocyanate. The foam had a rise of 4.8 inches, 40 to 45 cells per inch, moderate buckshot and a density of 1.9 pounds per cubic foot.

Part A of Example 7 also illustrates that the copolymer can have a siloxane content as high as 33 weight percent when the amine catalysts are less active than hexadecyl dimethyl amine.

What is claimed is:

1. A process for producing a flexible polyester urethane foam, said process comprising foaming and reacting a reaction mixture produced from:
    (I) a polyester resin having an average of at least 2 hydroxyl groups per molecule and having a hydroxyl number of from 45 to 150;
    (II) a polyisocyanate, said polyester and said polyisocyanate being present in the mixtures in a major amount and in the relative amount required to produce the urethane;
    (III) a blowing agent in a minor amount sufficient to foam the reaction mixture; and
    (IV) a surfactant-catalyst mixture consisting of (i) a foam stabilizing amount of a siloxane-oxyalkylene copolymer having molecular weight from 780 to 17,000, a siloxane content from 14 to 42 weight percent based on the weight of the copolymer and an oxyethylene content of at least 75 weight percent based on the total amount of oxyalkylene groups in the copolymer, said copolymer having a siloxane portion consisting essentially of groups represented by the formula:

$$R_bSiO_{\frac{4-b}{2}}$$

wherein R is a member selected from the group consisting of the monovalent hydrocarbon groups and the divalent organic groups, $b$ has a value from 1 to 3 inclusive, at least one group represented by R in the siloxane portion being a divalent organic group and each divalent organic group linking the siloxane group to an oxyalkylene portion of the copolymer and said copolymer having an oxyalkylene portion consisting essentially of recurring oxyalkylene groups; and (ii) a catalytic amount of a highly active catalyst for the production of urethanes, said highly active catalyst being a compound whose catalytic activity for the reaction of hydroxyl groups and isocyanato groups to produce urethane groups is greater than the catalytic activity of N-ethyl morpholine.

2. A process for producing a flexible polyester urethane foam, said process comprising simultaneously foaming and reacting a reaction mixture comprising:
    (I) a polyester resin having an average of at least 2 hydroxyl groups per molecule and having a hydroxyl number of from 45 to 150;
    (II) a polyisocyanate, said polyester and said polyisocyanate being present in the mixture in a major amount and in the relative amount required to produce the urethane;
    (III) a blowing agent in a minor amount sufficient to foam the reaction mixture;
    (IV) a foam stabilizing amount of a siloxane-oxyalkylene copolymer having molecular weight from 3,000 to 17,000, a siloxane content from 14 to 42 weight percent based on the weight of the copolymer and an oxyethylene content of at least 75 weight percent based on the total amount of oxyalkylene groups in the copolymer, said copolymer having a siloxane portion consisting essentially of groups represented by the formula:

wherein R is a member selected from the group consisting of the monovalent hydrocarbon groups and the divalent organic groups, $b$ has a value from 1 to 3 inclusive, at least one group represented by R in the siloxane portion being a divalent organic group and each divalent organic group linking the siloxane group to an oxyalkylene portion of the copolymer, and said copolymer having an oxyalkylene portion consisting essentially of recurring oxyalkylene groups; and
    (V) a catalytic amount of a highly active catalyst for the production of urethanes, said highly active catalyst being a compound whose catalytic activity for the reaction of hydroxyl groups and isocyanato groups to produce urethanes is greater than the catalytic activity of N-ethyl morpholine.

3. A process for producing a flexible polyester urethane foam, said process comprising simultaneously foaming and reacting a reaction mixture comprising:
    (I) a polyester resin having an average of at least 2 hydroxyl groups per molecule and having a hydroxyl number of from 45 to 150;
    (II) a polyisocyanate, said polyester and said polyisocyanate being present in the mixture in a major amount and in the relative amount required to produce the urethane;
    (III) a blowing agent, in a minor amount sufficient to foam the reaction mixture;
    (IV) a foam stabilizing amount of a siloxane-oxyalkylene copolymer having molecular weight from 3,000 to 11,000, a siloxane content from 14 to 20 weight percent based on the weight of the copolymer and an oxyethylene content of at least 75 weight percent based on the total amount of oxyalkylene groups in the copolymer, said copolymer having a siloxane portion consisting essentially of groups represented by the formula

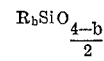

wherein R is a member selected from the group consisting of the monovalent hydrocarbon groups and the divalent organic groups, $b$ has a value from 1 to 3 inclusive, at least one group represented by R in the siloxane portion being a divalent organic group and each divalent organic group linking the siloxane group to the oxyalkylene portion of the copolymer, and said copolymer having an oxyalkylene portion consisting essentially of recurring oxyalkylene groups; and (V) a catalytic amount of a catalyst for the production of urethanes.

4. The process of claim 2 wherein the highly active catalyst is a member selected from the group consisting of triethylamine, N,N,N',N' - tetramethyl - 1,3 - butane diamine, triethylene diamine, dimethylethanol amine, dibutyltin dilaurate, dibutyltin di-2 ethylhexoate, stannous octoate and stannous oleate.

5. A process of claim 3 wherein the catalyst is a member selected from the group consisting of triethylamine, N,N,N',N' - tetramethyl - 1,3 - butane diamine, triethylene diamine, N,N - dimethyl ethanol amine, dibutyltin dilaurate, dibutyltin di-2 ethylhexoate, stannous octoate and stannous oleate.

6. The process of claim 3 wherein the catalyst is a member selected from the group consisting of N-methyl morpholine, N-ethyl morpholine, hexadecyl dimethyl amine, dimethyl benzyl amine, and N-cocomorpholine.

7. The process of claim 1 wherein the siloxane-oxyalkylene copolymer has the formula:

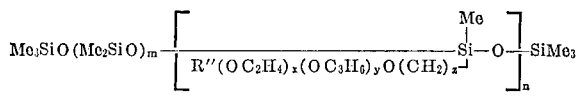

wherein Me represents a methyl group, R" is an alkyl group containing from 1 to 4 carbon atoms inclusive, $m$ has a value from 0 to 20 inclusive, $n$ has a value from 2 to 10, $x$ has a value from 4 to 30 inclusive, $y$ has a value from 0 to 6 inclusive, and $z$ has a value from 2 to 3 inclusive.

8. A process for producing a flexible polyester urethane foam, said process comprising simultaneously foaming and reacting a reaction mixture comprising:

(I) a polyester resin heaving an average of at least two hydroxyl groups per molecule and having a hydroxyl number of 45 to 150, said resin being a member selected from the group consisting of a reaction product of adipic acid, diethylene glycol and trimethylolpropane, and a reaction product of glycerol, adipic acid and diethylene glycol;

(II) a mixture of 2,4 - tolylene diisocyanate and 2,6-tolylene diisocyanate, said diisocyanates being present in an amount from 90 to 105% of the amount required to provide the stoichiometric amount of isocyanate groups required to react with the hydroxyl groups of the polyester and any water present as a blowing agent;

(III) from 3 to 5 parts by weight, per 100 parts by weight of the polyester of at least one blowing agent of the group consisting of water and fluorocarbon blowing agents;

(IV) a siloxane-oxyalkylene copolymer having a molecular weight from 3000 to 17,000, a siloxane content from 14 to 42 weight percent based on the weight of the copolymer and an oxyalkylene content of at least 75 weight percent based on the total amount of oxyalkylene groups in the copolymer, said siloxane-oxyalkylene copolymer having the formula:

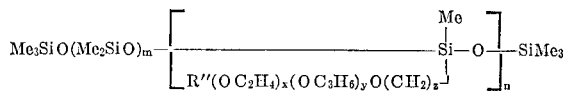

wherein Me represents a methyl group, R" is an alkyl group containing from 1 to 4 carbon atoms inclusive, $m$ has a value from 0 to 20 inclusive, $n$ has a value from 2 to 10, $x$ has a value from 4 to 30 inclusive, $y$ has a value from 0 to 6 inclusive and $z$ has a value from 2 to 3 inclusive, said copolymer being present in an amount of from 0.15 to 4.0 parts by weight per 100 parts by weight of the total weight of the polyester and the diisocyanate; and (V) a highly active catalyst for the production of urethanes selected from the group consisting of triethylamine, N,N,N',N' - tetramethyl - 1,3 - butane diamine, triethylene diamine N,N - dimethyl ethanol amine, dibutyltin dilaurate, dibutyltin di - 2 - ethylhexoate, stannous octoate and stannous oleate.

9. The process of claim 8 wherein the reaction mixture contains, as an additional component, a catalyst selected from the group consisting of N-methyl morpholine, N-ethyl morpholine, hexadecyl dimethyl amine, dimethyl benzyl amine and N-cocomorpholine.

10. A process for producing a flexible polyester urethane foam, said process comprising simultaneously foaming and reacting a reaction mixture comprising:

(I) a polyester resin having an average of at least two hydroxyl groups per molecule and having a hydroxyl group of 45 to 150, said resin being a member selected from the group consisting of a reaction product of adipic acid, diethylene glycol and trimethylolpropane, and a reaction product of glycerol, adipic acid and diethylene glycol;

(II) a mixture of 2,4-tolylene diisocyanate and 2,6-tolylene diisocyanate, said diisocyanates being present in an amount from 90 to 105% of the amount required to provide the stoichiometric amount of isocyanato groups required to react with the hydroxyl groups of the polyester and any water present as a blowing agent;

(III) from 2 to 15 parts by weight per 100 parts by weight of the polyester of at least one blowing agent of the group consisting of water and fluorocarbon blowing agents;

(IV) a siloxane-oxyalkylene copolymer having a molecular weight from 3000 to 11,000, a siloxane content from 14 to 20 weight percent based on the weight of the copolymer and an oxyalkylene content of at least 75 weight percent based on the total amount of oxyalkylene groups in the copolymer, said siloxane-oxyalkylene copolymer having the formula:

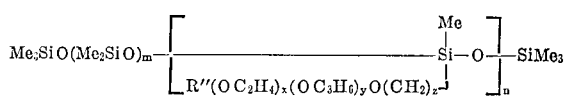

wherein Me represents a methyl group, R" is an alkyl group containing from 1 to 4 carbon atoms inclusive, $m$ has a value from 0 to 20 inclusive, $n$ has a value from 2 to 10, $x$ has a value from 4 to 30 inclusive, $y$ has a value from 0 to 6 inclusive and $z$ has a value from 2 to 3 inclusive, said copolymer being present in an amount of from 0.15 to 4.0 parts by weight per 100 parts by weight of the total weight of the polyester and the diisocyanate; and (V) a catalyst for the production of urethanes selected from the group consisting of triethylamine, N,N,N', N', - tetramethyl - 1,3 - butane diamine, triethylene diamine, N,N-dimethyl ethanol amine, dibutyltin dilaurate, dibutyltin di-2 ethylhexoate, stannous octoate, stannous oleate, N - methyl morpholine, N-ethyl morpholine, hexadecyl dimethyl amine, dimethyl benzyl amine and N - cocomorpholine, said catalyst being present in an amount of from 0.1 to 2.0 parts by weight per 100 parts by weight of the total weight of polyester and the diisocyanates.

11. A process for producing a flexible polyester urethane foam, said process comprising foaming and reacting a reaction mixture produced from:

(I) a polyester resin having an average of at least 2 hydroxyl groups per molecule and having a hydroxyl number of from 45 to 150;

(II) a polyisocyanate, said polyester and said polyisocyanate being present in the mixtures in a major amount and in the relative amount required to produce the urethane;

(III) a blowing agent in a minor amount sufficient to foam the reaction mixture; and (IV) a second surfactant-catalyst mixture consisting of (i) a foam stabilizing amount of a siloxane-oxyalkylene copolymer having molecular weight from 780 to 11,000, a siloxane content from 14 to 33 weight percent based on the weight of the copolymer and an oxyethylene content of at least 75 weight percent based on the total amount of oxyalkylene groups in the copolymer, said copolymer having a siloxane portion consisting essentially of groups represented by the formula:

$$R_b SiO_{\frac{4-b}{2}}$$

wherein R is a member selected from the group consisting of the monovalent hydrocarbon groups and the divalent organic groups, $b$ has a value from 1 to 3 inclusive, at least one group represented by R in the siloxane portion being a divalent organic group and each divalent organic group linking the siloxane group to the oxyalkylene portion of the copolymer, and said copolymer having an oxyalkylene portion consisting essentially of recurring oxyalkylene groups, and (ii) a catalytic amount of a catalyst for the production of urethanes, said catalyst being a compound whose catalytic activity for the reaction of hydroxyl groups and isocyanato groups to produce urethane groups is less than the catalytic activity of hexadecyl dimethyl amine.

References Cited

UNITED STATES PATENTS

| | | | |
|---|---|---|---|
| 3,044,971 | 7/1962 | Polis | 260—2.5 |
| 3,055,845 | 9/1962 | Merten et al. | 260—2.5 |
| 3,084,177 | 4/1963 | Hostettler et al. | 260—404.5 |
| 3,136,731 | 6/1964 | Piechota et al | 260—2.5 |
| 3,194,770 | 7/1965 | Hostettler | 252—431 |
| 3,206,415 | 9/1965 | Koepnick et al. | 260—2.5 |
| 3,230,185 | 1/1966 | Koepnick et al. | 260—2.5 |
| 3,238,154 | 3/1966 | Mosso | 260—2.5 |
| 3,243,389 | 3/1966 | Moeller et al. | 260—2.5 |
| 3,272,762 | 9/1966 | Ibbotson et al. | 260—2.5 |
| 3,356,758 | 12/1967 | Omietanski et al. | 260—824 |
| 3,280,160 | 12/1966 | Bailey | 260—448.2 |
| 3,507,815 | 4/1970 | Bailey et al. | 260—2.5 |

HOSEA E. TAYLOR, Primary Examiner

H. S. COCKERAM, Assistant Examiner

U.S. Cl. X.R.

260—75, 18

PO-1050
(5/69)

UNITED STATES PATENT OFFICE
CERTIFICATE OF CORRECTION

Patent No. 3,563,924      Dated February 16, 1971

Inventor(s) E.G. Schwarz

It is certified that error appears in the above-identified patent and that said Letters Patent are hereby corrected as shown below:

Column 1, line 31, "Sept. 4, 1964" should read --- Sept. 14, 1964 ---.
Column 1, line 37, "hydroxyy" should read --- hydr(
Column 3, line 35 "ny" should read --- any ---.
Column 4, line 67 the formula "$(CH_3SiO_{0.5})$" shoul( read --- $((CH_3)_3SiO_{0.5})$ ---.
Columns 15-16, in the formula of "Siloxane I (abb: Sil.I)" that portion shown as "$[SiO]_{7.2}$" should be --- [Si( Columns 15-16 under the table headed "Catalysts f( the production of urethanes:", "SnOct" should read ---SnOct:
Column 16, line 54 (last line of the table coveri( columns 15-16). The term "Fomrex" should read --- Fomrez -(
Column 16 line 70, "weer" should read --- were ---
Column 23, line 60 (line 4 of paragraph "(IV)" of claim 8) the term "oxyalkylene" should read --- oxyethylene
Column 24, line 6 there should be a "comma" after the term "diamine".
Column 24, line 38 (line 4 of paragraph "(IV)" of claim 10) the term "oxyalkylene" should read ---oxyethylene Signed and sealed this 14th day of December 1971.

(SEAL)
Attest:

EDWARD M. FLETCHER, JR.
Attesting Officer

ROBERT GOTTSCHALK
Acting Commissioner of Patent: